United States Patent
Ravirala et al.

(10) Patent No.: US 11,825,207 B1
(45) Date of Patent: Nov. 21, 2023

(54) METHODS AND SYSTEMS FOR SHIFT ESTIMATION FOR ONE OR MORE OUTPUT FRAMES

(71) Applicant: QUALCOMM Incorporated, San Diego, CA (US)

(72) Inventors: Narayana Karthik Ravirala, San Diego, CA (US); Chanchal Raj, Supaul (IN); Shizhong Liu, San Diego, CA (US); Weiliang Liu, San Diego, CA (US); Ron Gaizman, Hof HaCarmel (IL); Lianming Shi, Richmond, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/734,950

(22) Filed: May 2, 2022

(51) Int. Cl.
*H04N 23/73* (2023.01)
*H04N 23/741* (2023.01)
*H04N 5/14* (2006.01)

(52) U.S. Cl.
CPC ............ *H04N 23/73* (2023.01); *H04N 5/144* (2013.01); *H04N 23/741* (2023.01)

(58) Field of Classification Search
CPC ....... H04N 23/73; H04N 5/144; H04N 23/741
See application file for complete search history.

(56) References Cited

U.S. PATENT DOCUMENTS

| | | | | |
|---|---|---|---|---|
| 9,213,962 | B2* | 12/2015 | Westaway | ........... H04L 65/4015 |
| 2008/0166115 | A1* | 7/2008 | Sachs | ................... H04N 23/68 |
| | | | | 396/55 |
| 2020/0211166 | A1 | 7/2020 | Yao et al. | |

OTHER PUBLICATIONS

Dasari R., et al., "A Joint Visual-Inertial Image Registration for Mobile HDR Imaging", The 30th Anniversary of Visual Communications and Image Processing (VCIP), Nov. 27-30, 2016, Chengdu, China, Nov. 1, 2016, XP093055792, 4 pages, abstract Section I, Section III.A.
International Search Report and Written Opinion—PCT/US2023/064724—ISA/EPO—dated Jun. 28, 2023.

\* cited by examiner

*Primary Examiner* — Ahmed A Berhan
(74) *Attorney, Agent, or Firm* — Polsinelli/Qualcomm

(57) ABSTRACT

The present disclosure generally relates to exposure control for image capture devices. One example method generally includes receiving sensor data indicating a movement associated with an image capture device capturing a first frame and a second frame, wherein the first frame is associated with a higher exposure setting as compared to the second frame; predicting, based on the sensor data, a shift for aligning one or more features of the first frame and one or more features of the second frame; applying the shift to align the one or more features of the first frame and the one or more features of second frame; and generating a frame output at least in part by combining at least a portion of the first frame with at least a portion of the second frame.

23 Claims, 15 Drawing Sheets

METHODS AND SYSTEMS FOR SHIFT ESTIMATION FOR ONE OR MORE OUTPUT FRAMES

FIELD

The present disclosure generally relates to exposure control for image capture devices. In some examples, aspects of the present disclosure are related to alignment of frames (or images) associated with different exposure times based on an estimated shift for the frames (or images).

BACKGROUND

A camera is a device that receives light and captures image frames, such as still images or video frames, using an image sensor. Cameras may include processors, such as image signal processors (ISPs), that can receive one or more image frames and process the one or more image frames. For example, a raw image frame captured by a camera sensor can be processed by an ISP to generate a final image. Cameras can be configured with a variety of image capture and image processing settings to alter the appearance of an image. Some camera settings are determined and applied before or during capture of the photograph, such as ISO, exposure time, aperture size, f/stop, shutter speed, focus, and gain. Other camera settings can configure post-processing of a photograph, such as alterations to contrast, brightness, saturation, sharpness, levels, curves, or colors.

Cameras can be configured with a variety of image capture and image processing settings. Application of different settings can result in frames or images with different appearances. Some camera settings are determined and applied before or during capture of the photograph, such as ISO, exposure time (also referred to as exposure duration), aperture size, f/stop, shutter speed, focus, and gain. Other camera settings can configure post-processing of a photograph, such as alterations to contrast, brightness, saturation, sharpness, levels, curves, or colors.

In photography, exposure of an image captured by a camera refers to the amount of light per unit area which reaches a photographic film, or in modern cameras, an electronic image sensor. The exposure is based on camera settings, such as shutter speed, exposure time, and/or lens aperture, as well as the luminance of the scene being photographed. Many cameras are equipped with an automatic exposure or "auto exposure" mode, where the exposure settings (e.g., shutter speed, exposure time, lens aperture, etc.) may be automatically adjusted to match, as closely as possible, the luminance of the scene or subject being photographed. In some cases, an automatic exposure control (AEC) engine can perform AEC to determine exposure settings for an image sensor.

BRIEF SUMMARY

In some examples, systems and techniques are described xxx. According to at least one illustrative example, a method is provided for capturing images. The method includes: xxx.

Certain aspects provide an apparatus for frame alignment. The apparatus generally includes a memory; and at least one processor coupled to the memory and configured to: receive sensor data indicating a movement associated with an image capture device capturing a first frame and a second frame, wherein the first frame is associated with a higher exposure setting as compared to the second frame; predict, based on the sensor data, a shift for aligning one or more features of the first frame and one or more features of the second frame; apply the shift to align the one or more features of the first frame and the one or more features of second frame; and generate a frame output at least in part by combining at least a portion of the first frame with at least a portion of the second frame.

Certain aspects provide a method for frame alignment. The method generally includes receiving sensor data indicating a movement associated with an image capture device capturing a first frame and a second frame, wherein the first frame is associated with a higher exposure setting as compared to the second frame; predicting, based on the sensor data, a shift for aligning one or more features of the first frame and one or more features of the second frame; applying the shift to align the one or more features of the first frame and the one or more features of second frame; and generating a frame output at least in part by combining at least a portion of the first frame with at least a portion of the second frame.

Certain aspects provide a non-transitory computer-readable medium having instructions, which when executed by one or more processors, cause the one or more processors to: receive sensor data indicating a movement associated with an image capture device capturing a first frame and a second frame, wherein the first frame is associated with a higher exposure setting as compared to the second frame; predict, based on the sensor data, a shift for aligning one or more features of the first frame and one or more features of the second frame; apply the shift to align the one or more features of the first frame and the one or more features of second frame; and generate a frame output at least in part by combining at least a portion of the first frame with at least a portion of the second frame.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1A:
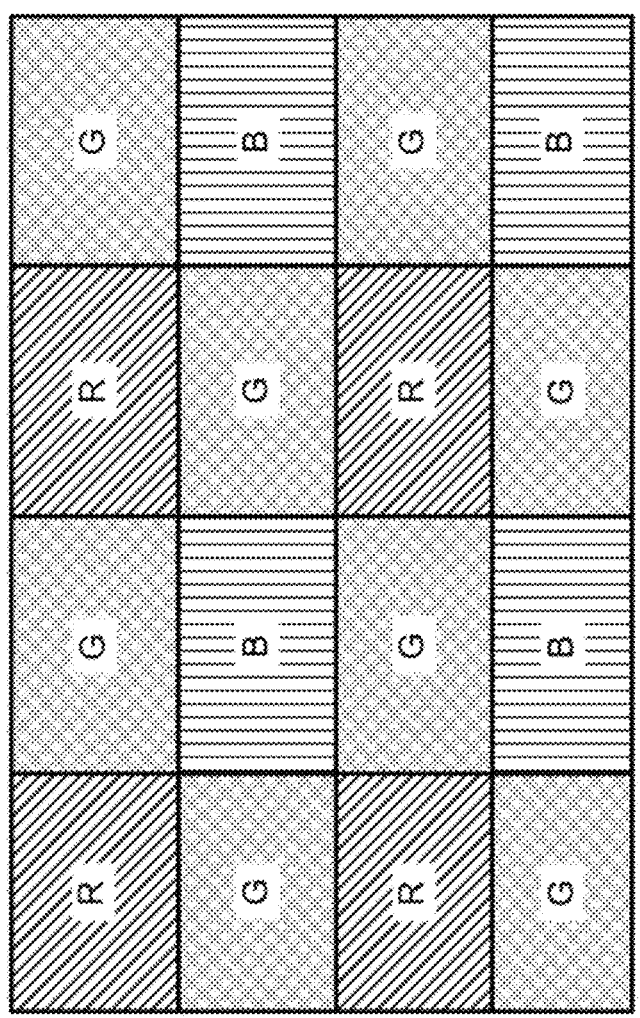
FIG. 1A, FIG. 1B, and FIG. 1C are diagrams illustrating example configurations for an image sensor of an image capture device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Systems, apparatuses, processes (also referred to as methods), and computer-readable media (collectively referred to herein as "systems and techniques") are described herein for the alignment of frames (or images or image frames) having different exposure times. As used herein, the terms image, frame, and image frame are used interchangeably. To generate a high dynamic range (HDR) image (e.g., frame), a long exposure frame and a short exposure frame may be captured using the same image sensor and fused to generate the HDR image. Thus, there may be a delay between when the long exposure frame is captured and when the short exposure frame is captured. Any motion during this delay may cause irregularities in the image or resultant video being generated. Thus, pixels of the long exposure frame (or short exposure frame) may be shifted to align features of the long exposure frame (or short exposure frame) with features of the short exposure frame (or long exposure frame).

Fusion of the long and short exposure frames may be done in-line (e.g., in real-time while each frame is captured), which is more power-efficient than performing the fusion once the full frame has been captured. However, the alignment may have to be programmed several frames in advance with such in-line operations. Certain aspects provide techniques for estimating a shift for the alignment of frames based on past samples. For example, a neural network may be used to estimate shifts for alignment in x and y dimensions (e.g., directions) based on previous samples for an in-line fusion. Once the shift is estimated for a particular frame in advance, the shift may be applied for alignment once the frame is captured. As used herein, a long exposure frame and a short exposure frame generally refer to any frames having different exposures where the long exposure frame has a longer exposure than the short exposure frame. Moreover, while some example provided herein describe techniques for fusing frames having different exposure times, the aspects of the present disclosure may be applied for fusing of frames having different exposure settings (e.g., fusion of a high exposure frame and a low exposure frame).

Image sensors include one or more arrays of photodiodes or other photosensitive elements. Each photodiode measures an amount of light that eventually corresponds to a particular pixel in the image produced by the image sensor. In some cases, different photodiodes may be covered by different color filters of a color filter array and may thus measure light matching the color of the color filter covering the photodiode.

Figure 1B:
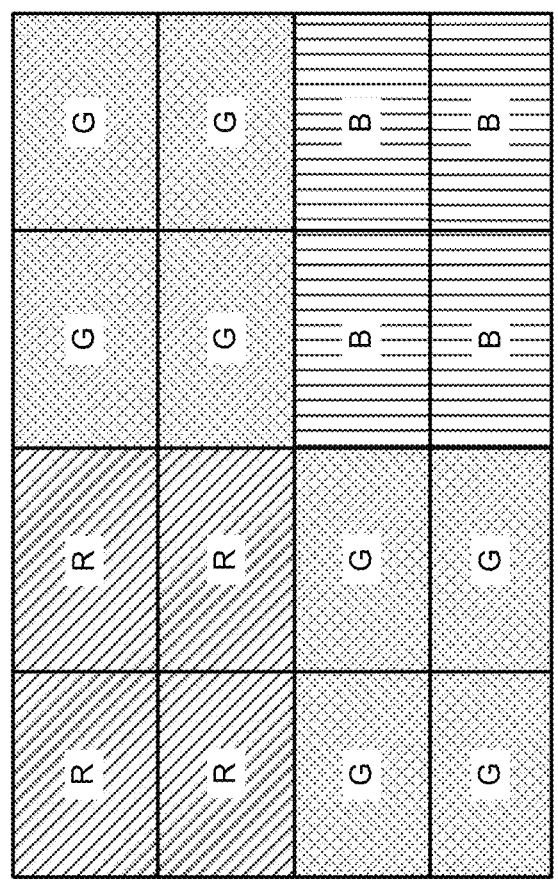

Various color filter arrays can be used, including a Bayer color filter array, a quad color filter array (also referred to as a quad Bayer filter or QCFA), and/or other color filter array. An example of a Bayer color filter array 100 is shown in FIG. 1A. As shown, the Bayer color filter array 100 includes a repeating pattern of red color filters, blue color filters, and green color filters. As shown in FIG. 1B, a QCFA 110 includes a 2×2 (or "quad") pattern of color filters, including a 2×2 pattern of red (R) color filters, a pair of 2×2 patterns of green (G) color filters, and a 2×2 pattern of blue (B) color filters. The pattern of the QCFA 110 shown in FIG. 1B is repeated for the entire array of photodiodes of a given image sensor. Using either QCFA 110 or the Bayer color filter array 100, each pixel of an image is generated based on red light data from at least one photodiode covered in a red color filter of the color filter array, blue light data from at least one photodiode covered in a blue color filter of the color filter array, and green light data from at least one photodiode covered in a green color filter of the color filter array. Other types of color filter arrays may use yellow, magenta, and/or cyan (also referred to as "emerald") color filters instead of or in addition to red, blue, and/or green color filters. The different photodiodes throughout the pixel array can have different spectral sensitivity curves, therefore responding to different wavelengths of light. Monochrome image sensors may also lack color filters and therefore lack color depth.

In some cases, subgroups of multiple adjacent photodiodes (e.g., 2×2 patches of photodiodes when QCFA 110 shown in FIG. 1B is used) can measure the same color of light for approximately the same region of a scene. For example, when photodiodes included in each of the subgroups of photodiodes are in close physical proximity, the light incident on each photodiode of a subgroup can originate from approximately the same location in a scene (e.g., a portion of a leaf on a tree, a small section of sky, etc.).

In some examples, a brightness range of light from a scene may significantly exceed the brightness levels that the image sensor can capture. For example, a digital single-lens reflex (DSLR) camera may be able to capture a 1:30,000 contrast ratio of light from a scene while the brightness levels of an HDR scene can exceed a 1:1,000,000 contrast ratio.

In some cases, HDR sensors may be utilized to enhance the contrast ratio of an image captured by an image capture device. In some examples, HDR sensors may be used to obtain multiple exposures within one image or frame, where such multiple exposures can include short (e.g., 5 ms) and long (e.g., 15 or more ms) exposure times. As used herein, a long exposure time generally refers to any exposure time that longer than a short exposure time.

Figure 1C:
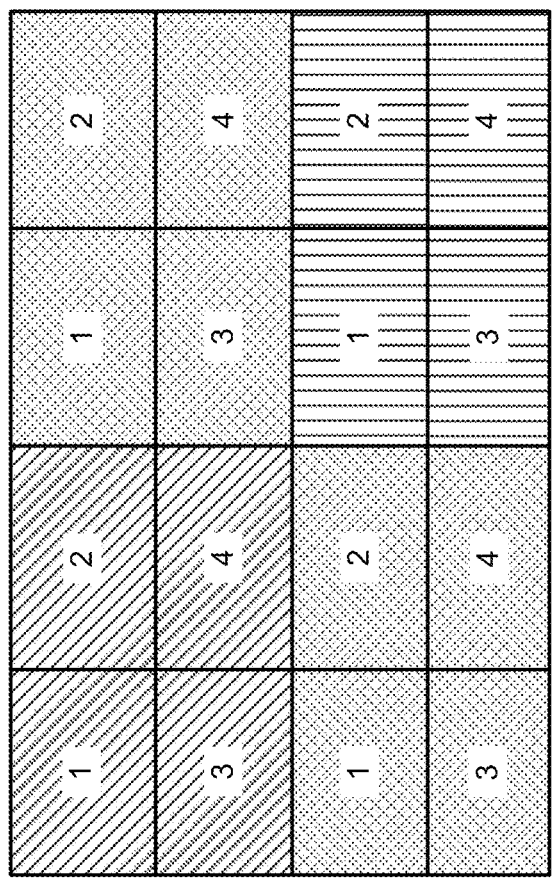

In some implementations, HDR sensors may be able to configure individual photodiodes within subgroups of photodiodes (e.g., the four individual R photodiodes, the four individual B photodiodes, and the four individual G photodiodes from each of the two 2×2 G patches in the QCFA 110 shown in FIG. 1B) to have different exposure settings. A collection of photodiodes with matching exposure settings is also referred to as photodiode exposure group herein. FIG. 1C illustrates a portion of an image sensor array with a QCFA filter that is configured with four different photodiode exposure groups 1 through 4. As shown in the example photodiode exposure group array 120 in FIG. 1C, each 2×2 patch can include a photodiode from each of the different photodiode exposure groups for a particular image sensor. Although four groupings are shown in a specific grouping in FIG. 1C, a person of ordinary skill will recognize that different numbers of photodiode exposure groups, different arrangements of photodiode exposure groups within subgroups, and any combination thereof can be used without departing from the scope of the present disclosure.

As noted with respect to FIG. 1C, in some HDR image sensor implementations, exposure settings corresponding to different photodiode exposure groups can include different exposure times (also referred to as exposure lengths), such as short exposure, medium exposure, and long exposure. In some cases, different images of a scene associated with different exposure settings can be formed from the light captured by the photodiodes of each photodiode exposure group. For example, a first image can be formed from the light captured by photodiodes of photodiode exposure group 1, a second image can be formed from the photodiodes of photodiode exposure group 2, a third image can be formed from the light captured by photodiodes of photodiode exposure group 3, and a fourth image can be formed from the light captured by photodiodes of photodiode exposure group 4. Based on the differences in the exposure settings corresponding to each group, the brightness of objects in the scene captured by the image sensor can differ in each image. For example, well-illuminated objects captured by a photodiode with a long exposure setting may appear saturated (e.g., completely white). In some cases, an image processor can select between pixels of the images corresponding to different exposure settings to form a combined image.

In one illustrative example, the first image corresponds to a short exposure time (also referred to as a short exposure image), the second image corresponds to a medium exposure time (also referred to as a medium exposure image), and the third and fourth images correspond to a long exposure time (also referred to as long exposure images). In such an example, pixels of the combined image corresponding to portions of a scene that have low illumination (e.g., portions of a scene that are in a shadow) can be selected from a long exposure image (e.g., the third image or the fourth image). Similarly, pixels of the combined image corresponding to portions of a scene that have high illumination (e.g., portions of a scene that are in direct sunlight) can be selected from a short exposure image (e.g., the first image.

In some cases, an image sensor can also utilize photodiode exposure groups to capture objects in motion without blur. The length of the exposure time of a photodiode group can correspond to the distance that an object in a scene moves during the exposure time. If light from an object in motion is captured by photodiodes corresponding to multiple image pixels during the exposure time, the object in motion can appear to blur across the multiple image pixels (also referred to as motion blur). In some implementations, motion blur can be reduced by configuring one or more photodiode groups with short exposure times. In some implementations, an image capture device (e.g., a camera) can determine local amounts of motion (e.g., motion gradients) within a scene by comparing the locations of objects between two consecutively captured images. For example, motion can be detected in preview images captured by the image capture device to provide a preview function to a user on a display. In some cases, a machine learning model can be trained to detect localized motion between consecutive images.

Figure 2:
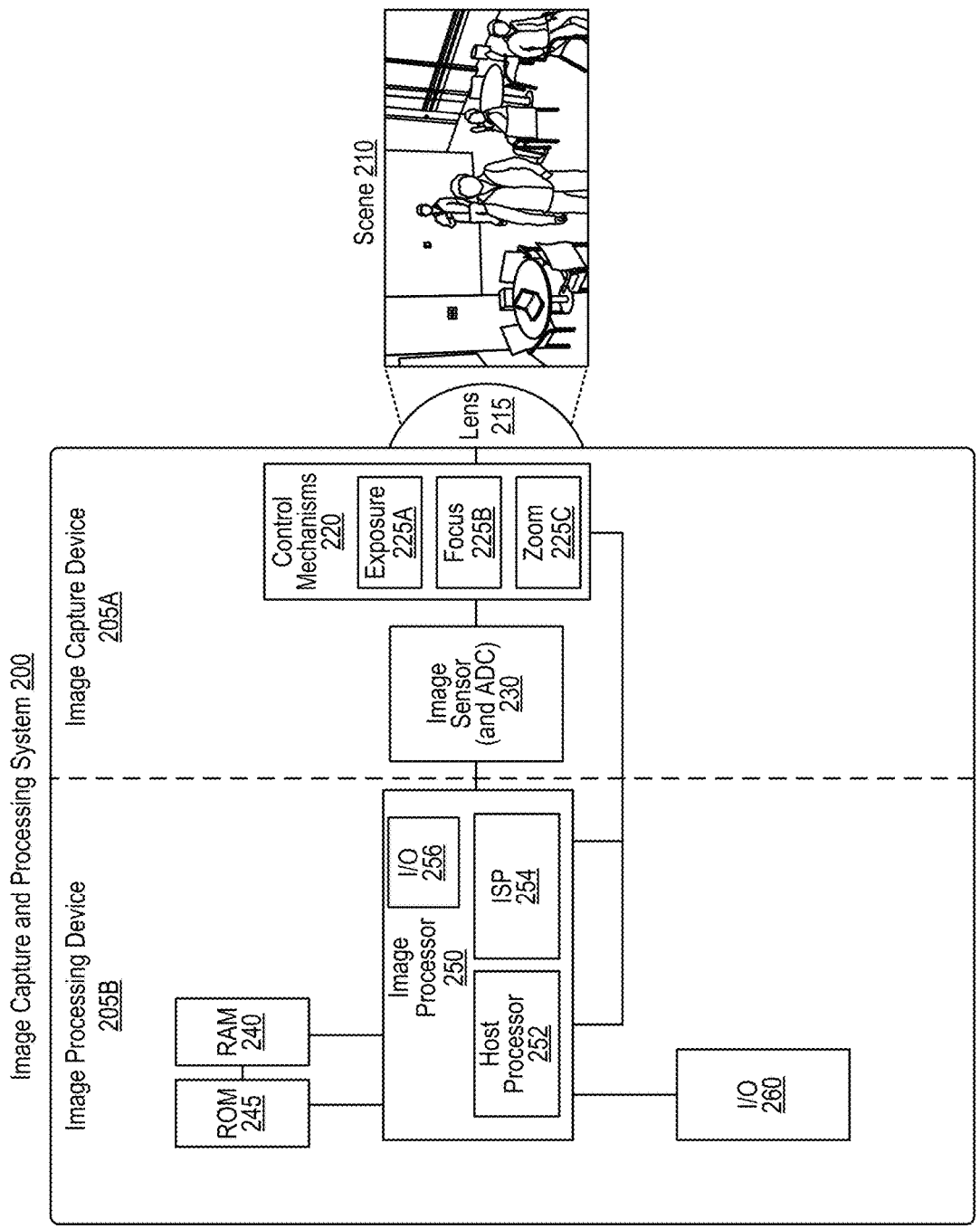
FIG. 2 is a block diagram illustrating an architecture of an image capture and processing device.

Various aspects of the techniques described herein will be discussed below with respect to the figures. FIG. 2 is a block diagram illustrating an architecture of an image capture and processing system 200. The image capture and processing system 200 includes various components that are used to capture and process images of scenes (e.g., an image of a scene 210). The image capture and processing system 200 can capture standalone images (or photographs) and/or can capture videos that include multiple images (or video frames) in a particular sequence. In some cases, the lens 215 and image sensor 230 can be associated with an optical axis. In one illustrative example, the photosensitive area of the image sensor 230 (e.g., the photodiodes) and the lens 215 can both be centered on the optical axis. A lens 215 of the image capture and processing system 200 faces a scene 210 and receives light from the scene 210. The lens 215 bends incoming light from the scene toward the image sensor 230. The light received by the lens 215 passes through an aperture. In some cases, the aperture (e.g., the aperture size) is controlled by one or more control mechanisms 220 and is received by an image sensor 230. In some cases, the aperture can have a fixed size.

The one or more control mechanisms 220 may control exposure, focus, and/or zoom based on information from the image sensor 230 and/or based on information from the image processor 250. The one or more control mechanisms 220 may include multiple mechanisms and components; for instance, the control mechanisms 220 may include one or more exposure control mechanisms 225A, one or more focus control mechanisms 225B, and/or one or more zoom control mechanisms 225C. The one or more control mechanisms 220 may also include additional control mechanisms besides those that are illustrated, such as control mechanisms controlling analog gain, flash, HDR, depth of field, and/or other image capture properties.

The focus control mechanism 225B of the control mechanisms 220 can obtain a focus setting. In some examples, focus control mechanism 225B store the focus setting in a memory register. Based on the focus setting, the focus control mechanism 225B can adjust the position of the lens 215 relative to the position of the image sensor 230. For example, based on the focus setting, the focus control mechanism 225B can move the lens 215 closer to the image sensor 230 or farther from the image sensor 230 by actuating a motor or servo (or other lens mechanism), thereby adjusting focus. In some cases, additional lenses may be included in the image capture and processing system 200, such as one or more microlenses over each photodiode of the image sensor 230, which each bend the light received from the lens 215 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 220, the image sensor 230, and/or the image processor 250. The focus setting may be referred to as an image capture setting and/or an image processing setting. In some cases, the lens 215 can be fixed relative to the image sensor and focus control mechanism 225B can be omitted without departing from the scope of the present disclosure.

The exposure control mechanism 225A of the control mechanisms 220 can obtain an exposure setting. In some cases, the exposure control mechanism 225A stores the exposure setting in a memory register. Based on this exposure setting, the exposure control mechanism 225A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 230 (e.g., ISO speed or film speed), analog gain applied by the image sensor 230, or any combination thereof. The exposure setting may be referred to as an image capture setting and/or an image processing setting.

The zoom control mechanism 225C of the control mechanisms 220 can obtain a zoom setting. In some examples, the zoom control mechanism 225C stores the zoom setting in a memory register. Based on the zoom setting, the zoom control mechanism 225C can control a focal length of an assembly of lens elements (lens assembly) that includes the lens 215 and one or more additional lenses. For example, the zoom control mechanism 225C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 215 in some cases) that receives the light from the scene 210 first, with the light then passing through an afocal zoom system between the focusing lens (e.g., lens 215) and the image sensor 230 before the light reaches the image sensor 230. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 225C moves one or more of the lenses in the afocal zoom system, such as the negative lens and one or both of the positive lenses. In some cases, zoom control mechanism 225C can control the zoom by capturing an image from an image sensor of a plurality of image sensors (e.g., including image sensor 230) with a zoom corresponding to the zoom setting. For example, image processing system 200 can include a wide angle image sensor with a relatively low zoom and a telephoto image sensor with a greater zoom. In some cases, based on the selected zoom setting, the zoom control mechanism 225C can capture images from a corresponding sensor.

The image sensor 230 includes one or more arrays of photodiodes or other photosensitive elements. Each photodiode measures an amount of light that eventually corresponds to a particular pixel in the image produced by the image sensor 230. In some cases, different photodiodes may be covered by different filters. In some cases, different photodiodes can be covered in color filters, and may thus measure light matching the color of the filter covering the photodiode. Various color filter arrays can be used, including a Bayer color filter array (as shown in FIG. 1A), a QCFA (see FIG. 1B), and/or any other color filter array.

Returning to FIG. 1A and FIG. 1B, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 230) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 230 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 230 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 220 may be included instead or additionally in the image sensor 230. The image sensor 230 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 13:
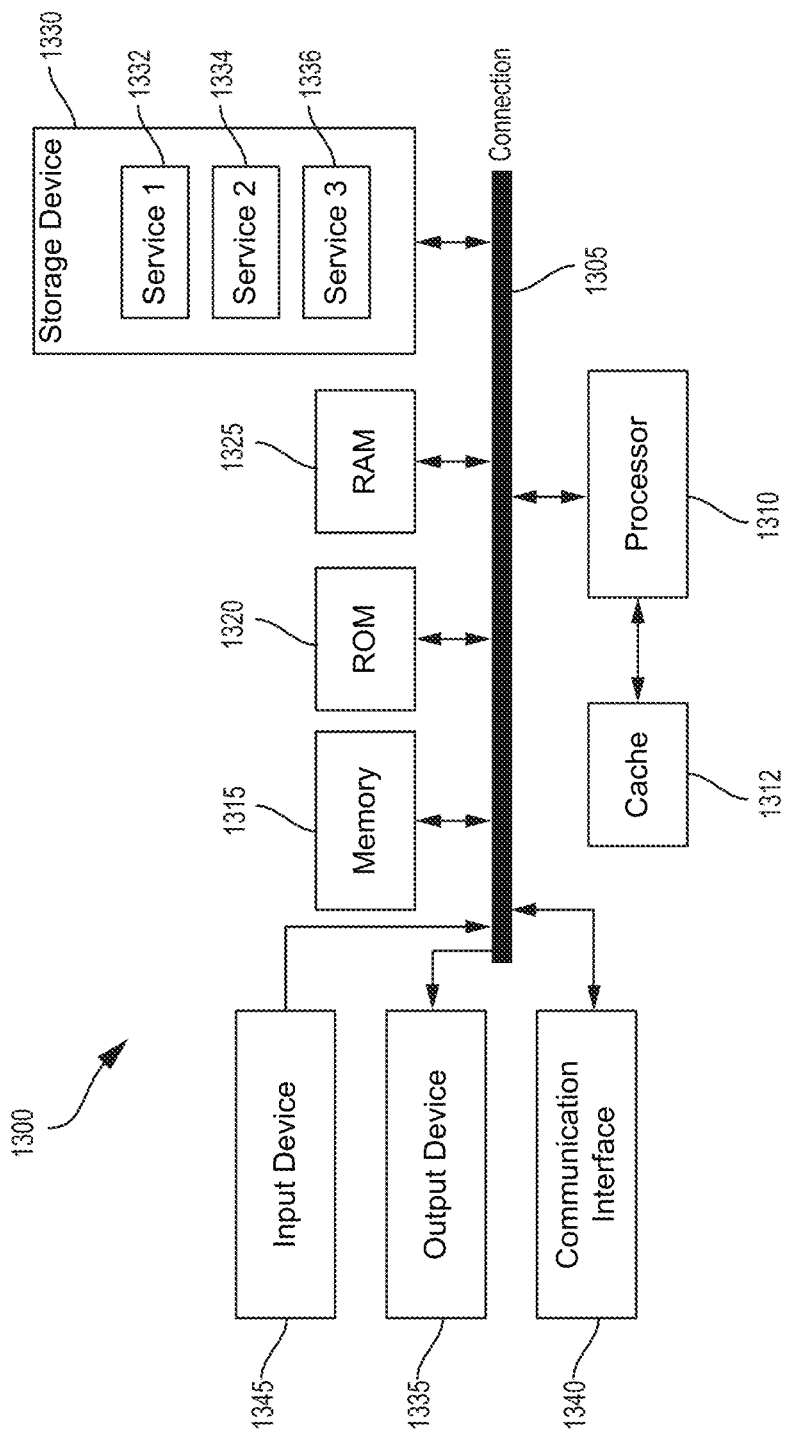
FIG. 13 is a diagram illustrating an example of a computing system for implementing certain aspects described herein.

The image processor 250 may include one or more processors, such as one or more image signal processors (ISPs) (including ISP 254), one or more host processors (including host processor 252), and/or one or more of any other type of processor 1310 discussed with respect to the computing system 1300 of FIG. 13. The host processor 252 can be a digital signal processor (DSP) and/or other type of processor. In some implementations, the image processor 250 is a single integrated circuit or chip (e.g., referred to as a system-on-chip or SoC) that includes the host processor 252 and the ISP 254. In some cases, the chip can also include one or more input/output ports (e.g., input/output (I/O) ports 256), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 256 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 252 can communicate with the image sensor 230 using an I2C port, and the ISP 254 can communicate with the image sensor 230 using an MIPI port.

The image processor 250 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 250 may store image frames and/or processed images in random access memory (RAM) 240/925, read-only memory (ROM) 245/920, a cache, a memory unit, another storage device, or some combination thereof.

Various input/output (I/O) devices 260 may be connected to the image processor 250. The I/O devices 260 can include a display screen, a keyboard, a keypad, a touchscreen, a trackpad, a touch-sensitive surface, a printer, any other output devices 1335, any other input devices 1345, or some combination thereof. In some cases, a caption may be input into the image processing device 205B through a physical keyboard or keypad of the I/O devices 260, or through a virtual keyboard or keypad of a touchscreen of the I/O devices 260. The I/O 260 may include one or more ports, jacks, or other connectors that enable a wired connection between the image capture and processing system 200 and one or more peripheral devices, over which the image capture and processing system 200 may receive data from the one or more peripheral device and/or transmit data to the one or more peripheral devices. The I/O 260 may include one or more wireless transceivers that enable a wireless connection between the image capture and processing system 200 and one or more peripheral devices, over which the image capture and processing system 200 may receive data from the one or more peripheral device and/or transmit data to the one or more peripheral devices. The peripheral devices may include any of the previously-discussed types of I/O devices 260 and may themselves be considered I/O devices 260 once they are coupled to the ports, jacks, wireless transceivers, or other wired and/or wireless connectors.

In some cases, the image capture and processing system 200 may be a single device. In some cases, the image capture and processing system 200 may be two or more separate devices, including an image capture device 205A (e.g., a camera) and an image processing device 205B (e.g., a computing device coupled to the camera). In some implementations, the image capture device 205A and the image processing device 205B may be coupled together, for example via one or more wires, cables, or other electrical connectors, and/or wirelessly via one or more wireless transceivers. In some implementations, the image capture device 205A and the image processing device 205B may be disconnected from one another.

As shown in FIG. 2, a vertical dashed line divides the image capture and processing system 200 of FIG. 2 into two portions that represent the image capture device 205A and the image processing device 205B, respectively. The image capture device 205A includes the lens 215, control mechanisms 220, and the image sensor 230. The image processing device 205B includes the image processor 250 (including the ISP 254 and the host processor 252), the RAM 240, the ROM 245, and the I/O 260. In some cases, certain components illustrated in the image capture device 205A, such as the ISP 254 and/or the host processor 252, may be included in the image capture device 205A.

The image capture and processing system 200 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 200 can include one or more wireless transceivers for wireless communications, such as cellular network communications, 802.11 wi-fi communications, wireless local area network (WLAN) communications, or some combination thereof. In some implementations, the image capture device 205A and the image processing device 205B can be different devices. For instance, the image capture device 205A can include a camera device and the image processing device 205B can include a computing device, such as a mobile handset, a desktop computer, or other computing device.

While the image capture and processing system 200 is shown to include certain components, one of ordinary skill will appreciate that the image capture and processing system 200 can include more components than those shown in FIG. 2. The components of the image capture and processing system 200 can include software, hardware, or one or more combinations of software and hardware. For example, in some implementations, the components of the image capture and processing system 200 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 200.

Figure 3:
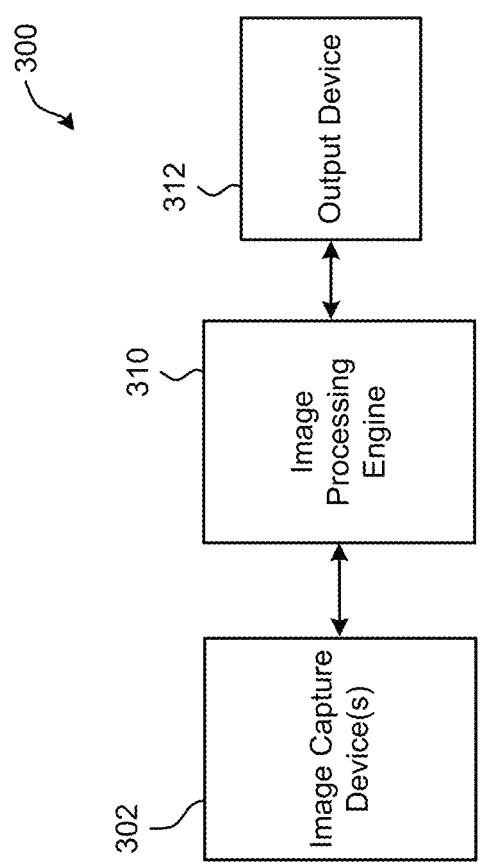
FIG. 3 is a block diagram illustrating an example of an image capture system.

FIG. 3 is a block diagram illustrating an example of an image capture system 300. The image capture system 300 includes various components that are used to process input images or frames to produce an output image or frame. As shown, the components of the image capture system 300 include one or more image capture devices 302, an image processing engine 310, and an output device 312. The image processing engine 310 can produce high dynamic range depictions of a scene, as described in more detail herein.

The image capture system 300 can include or be part of an electronic device or system. For example, the image capture system 300 can include or be part of an electronic device or system, such as a mobile or stationary telephone handset (e.g., smartphone, cellular telephone, or the like), an extended reality (XR) device (e.g., a virtual reality (VR) device, an augmented reality (AR) device, or a mixed reality (MR) device), a vehicle or computing device/system of a vehicle, a server computer (e.g., in communication with another device or system, such as a mobile device, an XR system/device, a vehicle computing system/device, etc.), a desktop computer, a laptop or notebook computer, a tablet computer, a set-top box, a television, a camera device, a display device, a digital media player, a video streaming device, or any other suitable electronic device. In some examples, the image capture system 300 can include one or more wireless transceivers (or separate wireless receivers and transmitters) for wireless communications, such as cellular network communications, 802.11 Wi-Fi communications, wireless local area network (WLAN) communications, Bluetooth or other short-range communications, any combination thereof, and/or other communications. In some implementations, the components of the image capture system 300 can be part of the same computing device. In some implementations, the components of the image capture system 300 can be part of two or more separate computing devices.

While the image capture system 300 is shown to include certain components, one of ordinary skill will appreciate that the exposure control system 300 can include more components or fewer components than those shown in FIG. 3. In some cases, additional components of the image capture system 300 can include software, hardware, or one or more combinations of software and hardware. For example, in some cases, the exposure control system 300 can include one or more other sensors (e.g., one or more inertial measurement units (IMUs), radars, light detection and ranging (LIDAR) sensors, audio sensors, etc.), one or more display devices, one or more other processing engines, one or more other hardware components, and/or one or more other software and/or hardware components that are not shown in FIG. 3. In some implementations, additional components of the exposure control system 300 can include and/or can be implemented using electronic circuits or other electronic hardware, which can include one or more programmable electronic circuits (e.g., digital signal processors (DSPs), microprocessors, microcontrollers, graphics processing units (GPUs), central processing units (CPUs), any combination thereof, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the exposure control system 300.

The one or more image capture devices 302 can capture image data and generate images (or frames) based on the image data and/or can provide the image data to the image processing engine 310 for further processing. The one or more image capture devices 302 can also provide the image data to the output device 312 for output (e.g., on a display). In some cases, the output device 312 can also include storage. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image. In addition to image data, the image capture devices can also generate supplemental information such as the amount of time between successively captured images, timestamps of image capture, or the like.

Figure 4:
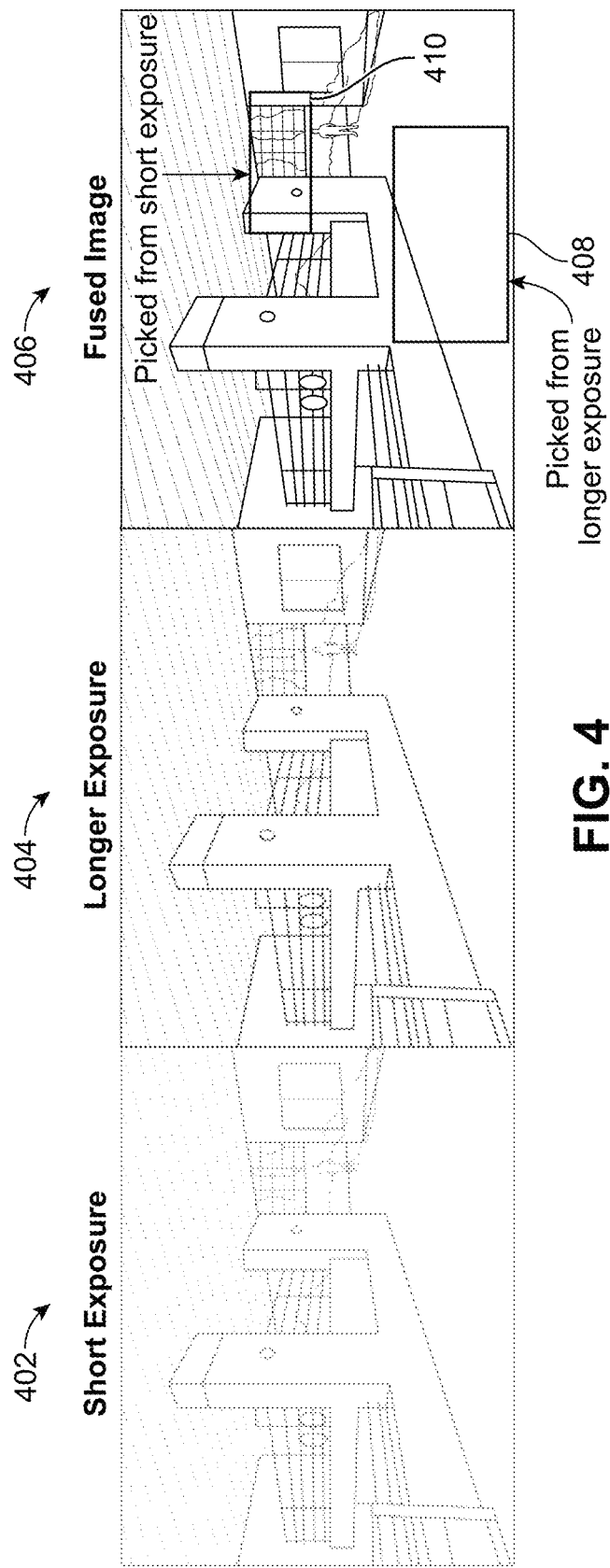
FIG. 4 illustrates techniques for generating a fused frame from short and long exposure frames.

FIG. 4 illustrates techniques for generating a fused frame from short and long exposure frames. As shown, a short exposure frame 402 and a long exposure frame 404 may be taken, which may be fused to provide a fused frame output 406 (e.g., a high dynamic range (HDR) output). Due to a bit depth of an image capture sensor, some pixels of a capture frame may be oversaturated, resulting in the image not showing some textures of a scene as shown in the short exposure frame 402. Thus, to generate an HDR frame, both short and long exposure frames may be captured, which may be fused (e.g., combined) to generate an HDR output frame. A fusion of short and long exposure frames may be performed to generate a fused output frame that includes parts of the short exposure frame and parts of the long exposure frame. For example, region 408 of the fused frame output 406 may be from the long exposure frame 404, while region 410 of the fused frame output 406 may be from the short exposure frame 402. However, fusing short and long exposure frames may result in irregularities due to global motion (e.g., motion of the image capture device). For example, from the time when the long exposure frame is captured to the time when the short exposure frame is captured, the image capture device or objects in a scene may have moved, causing irregularities if steps are not taken to align the short and long exposure frames prior to fusing the frames together. This global motion issue may also arise due to a rolling shutter, as described in more detail herein.

Figure 5:
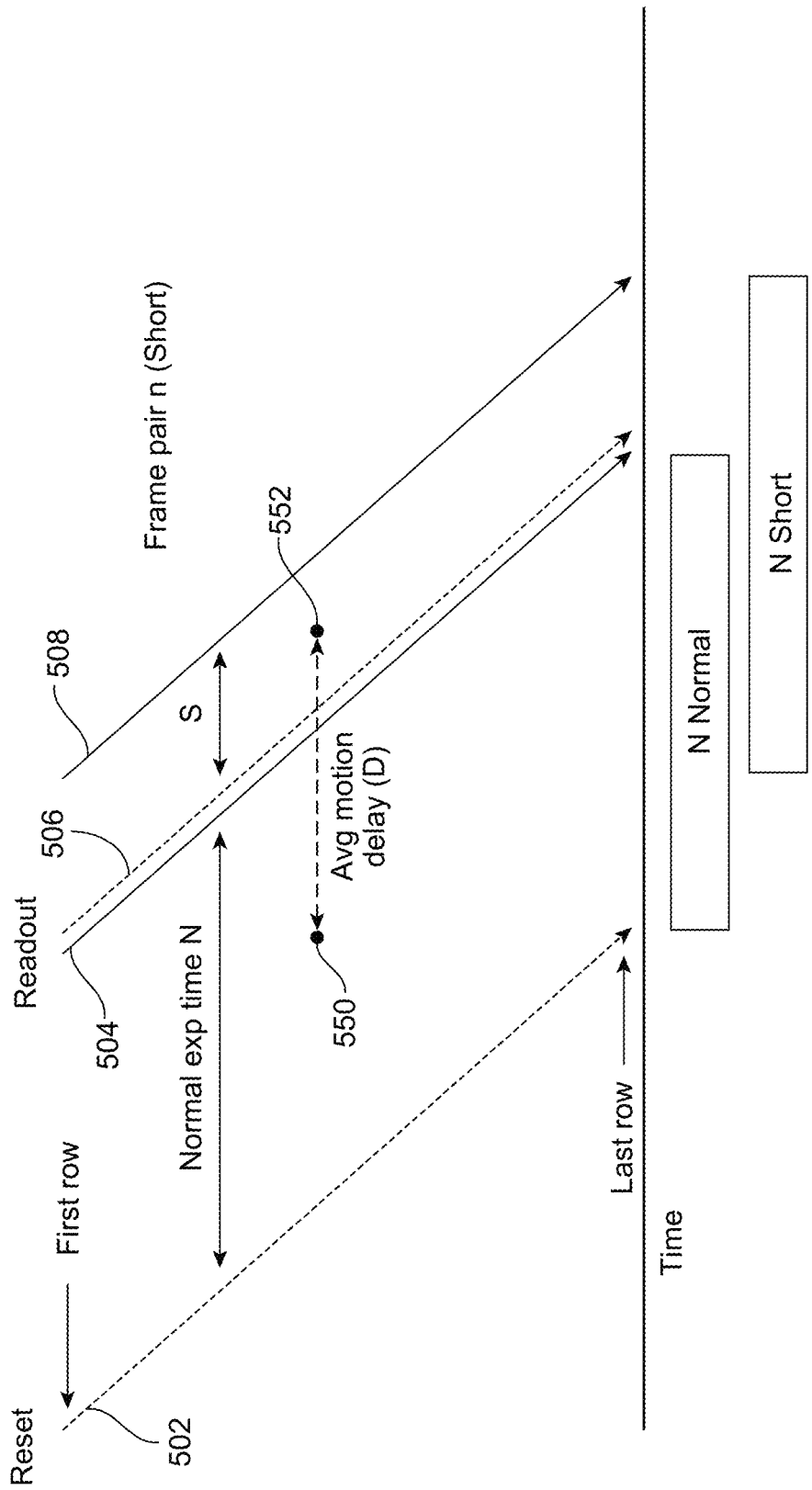
FIG. 5 illustrates long exposure and short exposure streams from an image sensor.

FIG. 5 illustrates long exposure and short exposure streams (e.g., mobile industry processor interface (MIPI) stream) from an image sensor (e.g., image sensor 230) to an imaging front end for processing. Line 502 represents the start of long exposure sensing (also referred to herein as normal exposure sensing), and line 504 represents the end of the long exposure sensing. The long exposure sensing starts from the first row of a sensor (e.g., image sensor 230 of FIG. 2) to the last row of the sensor, as shown. For each row (e.g., row of photodiodes), once the long exposure sensing has completed, short exposure sensing begins while the long exposure sensing continues to the next row. For example, line 506 represents the beginning of the short exposure sensing, and line 508 represents the end of the short exposure sensing, starting from the first row to the last row of the image sensor. The long exposure sensing (e.g., having a duration labeled "N Normal" in FIG. 5) may begin prior to the short exposure sensing (e.g., having a duration labeled "N short" in FIG. 5).

Once the long exposure sensing for a particular row is completed, a short delay (e.g., associated with the gap between lines 504, 506) occurs before the short exposure sensing begins. Once the short exposure sensing has finished for a particular row, the information for the row is read out from the image sensor for processing. Due to the gap from the long exposure sensing to the short exposure sensing (e.g., shown as an average motion delay (D) in FIG. 5), an opportunity exists for a user who is holding the camera to move and/or for objects in a scene being captured to move, resulting in a misalignment of features in the short and long exposure frames (e.g., features that are common or the same in the short and long exposure frames). For example, a motion delay (D) may exist from time 550 (e.g., time when half of the long exposure data is captured) and time 552 (e.g., the time when half of the short exposure data is captured). The motion delay (D) may be estimated as being the average motion delay associated with different long and short frame capture events (e.g., different HDR frame captures).

Since the sensing occurs one row at a time (e.g., starting from the first row to the last row), a rolling shutter global motion also occurs. The camera or objects in scene may move from when the data for a first row of sensors are captured to when the data for a last row of sensors are captured. Thus, upon reading out the short and long exposure data from the sensors, a rolling shutter correction (RSC) process and a frame alignment process may be performed.

Figure 6:
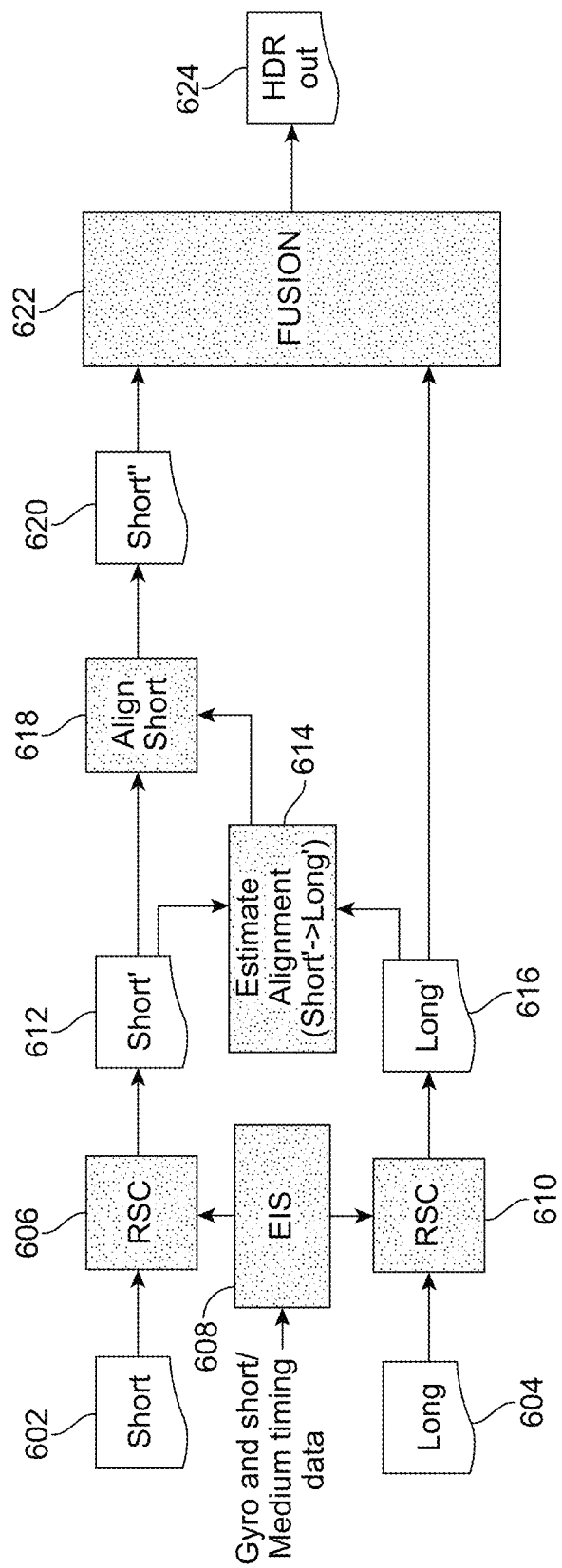
FIG. 6 illustrates an example image processing system.

FIG. 6 illustrates an example image processing system. As shown, a short exposure frame 602 and a long exposure frame 604 may each be input to a respective one of RSC elements 606, 610. Moreover, sensor (e.g., gyroscope, accelerometer, IMU, etc.) and timing data associated with the short and long exposure frames may be input to an electronic image stabilization element 608, which may generate information to be used for rolling shutter correction of the long and short frames. For example, the sensor (e.g., gyroscope, accelerometer, IMU, etc.) and timing data may be used to estimate the motion associated with the frames (e.g., due to changes in roll, pitch, and yaw of the camera) from when the first row of sensors captured data to when the last row of sensors captured data, which may be used to correct for such motion using the RSC elements.

The output of the RSC elements includes a short' frame 612 and a long' frame 616. The short' frame 612 and the long' frame 616 may be provided to an alignment estimation element 614, which may determine the motion associated with the delay from capturing the long and short frames, as described with respect to FIG. 5. This information may be used to align the short' frame 612 to the long' frame 616 at block 618. Based on the alignment, the short' frame 612 may be adjusted (e.g., by warping pixel data) to generate the short" frame 620. The short" frame 620 and the long' frame 616 may be provided to a fusion engine 622, which may generate the HDR output 624 (e.g., output the fused image, as described with respect to FIG. 4).

Figure 7:
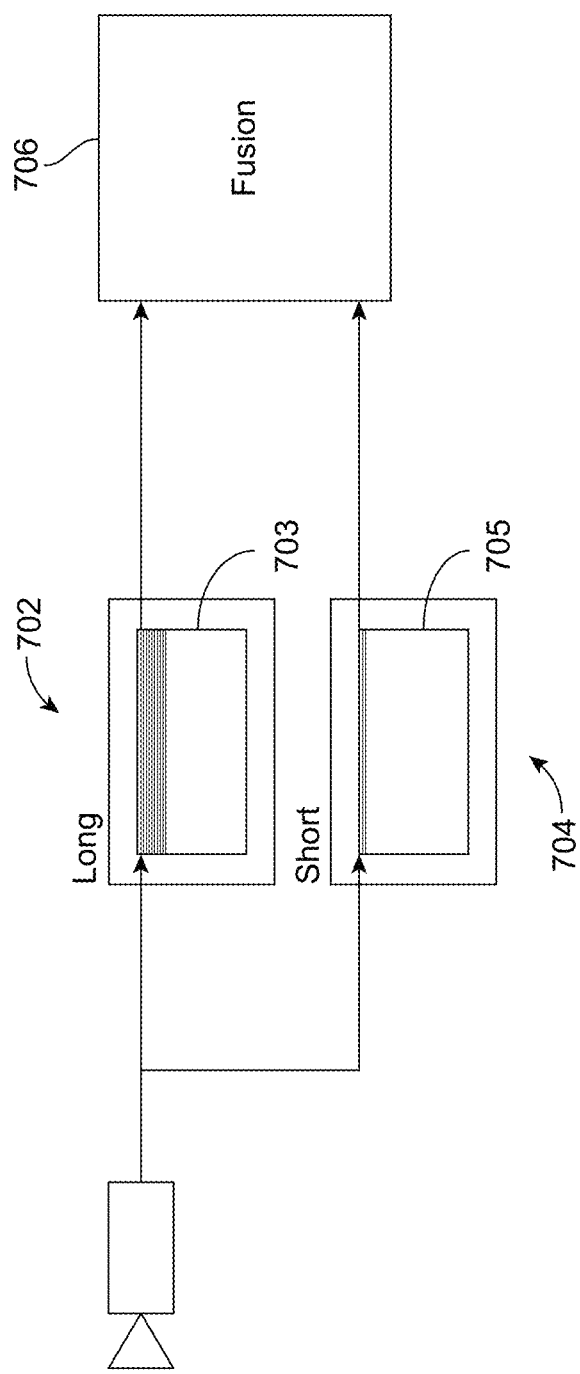
FIG. 7 illustrates techniques for an in-line fusion of short and long frames, in accordance with certain aspects of the present disclosure.

FIG. 7 illustrates techniques for an in-line fusion of one or more short exposure frames 704 and one or more long exposure frames 702, in accordance with certain aspects of the present disclosure. A fusion engine 706 can fuse the one or more short exposure frames 704 and the one or more long exposure frames 702 to generate an HDR frame. As described with respect to FIG. 5, long exposure data corresponding to the one or more long exposure frames 702 may be captured for each row prior to the short exposure data corresponding to the one or more short exposure frames 704. Therefore, the data from each row for the one or more long exposure frames 702 may be received and stored in a buffer 703 prior to the data for each row for the one or more short exposure frames 704 being stored in a buffer 705. As shown, the accumulation of data for the one or more long exposure frames 702 may be ahead of the accumulation of data for the one or more short exposure frames 704 (e.g., since the long exposure capture occurs prior to the short exposure capture as shown in FIG. 5).

In some cases, fusion by the fusion engine 706 may begin once a particular number of sensor rows or lines (e.g., the first 3 rows/lines, the first 4 rows/lines, the first 8 rows/lines, or other number of rows/lines) of the short frame data corresponding to the one or more short exposure frames 704 are accumulated. For example, upon receiving the short frame data for the particular number of sensor rows, operation for frame alignment may begin (e.g., instead of waiting for the entire frame to be received). However, various constraints may exist when performing frame alignment. For example, it may not be possible to fully warp a long exposure frame (from one or more long exposure frames 702) to align with a short exposure frame (from the one or more short exposure frames 704). Moreover, due to hardware timing constraints, the programming of alignment may have to be performed two or three frames in advance. In some aspects, a large buffer may be established for capturing frame data. Image data from the image sensor may be written at the center part of the image buffer, enabling the application of shifts in x and y dimensions to the data stored in the buffer for alignment. Moreover, certain aspects of the present disclosure provide techniques for alignment prediction to allow for the programming of alignment operations in advance.

Figure 8:
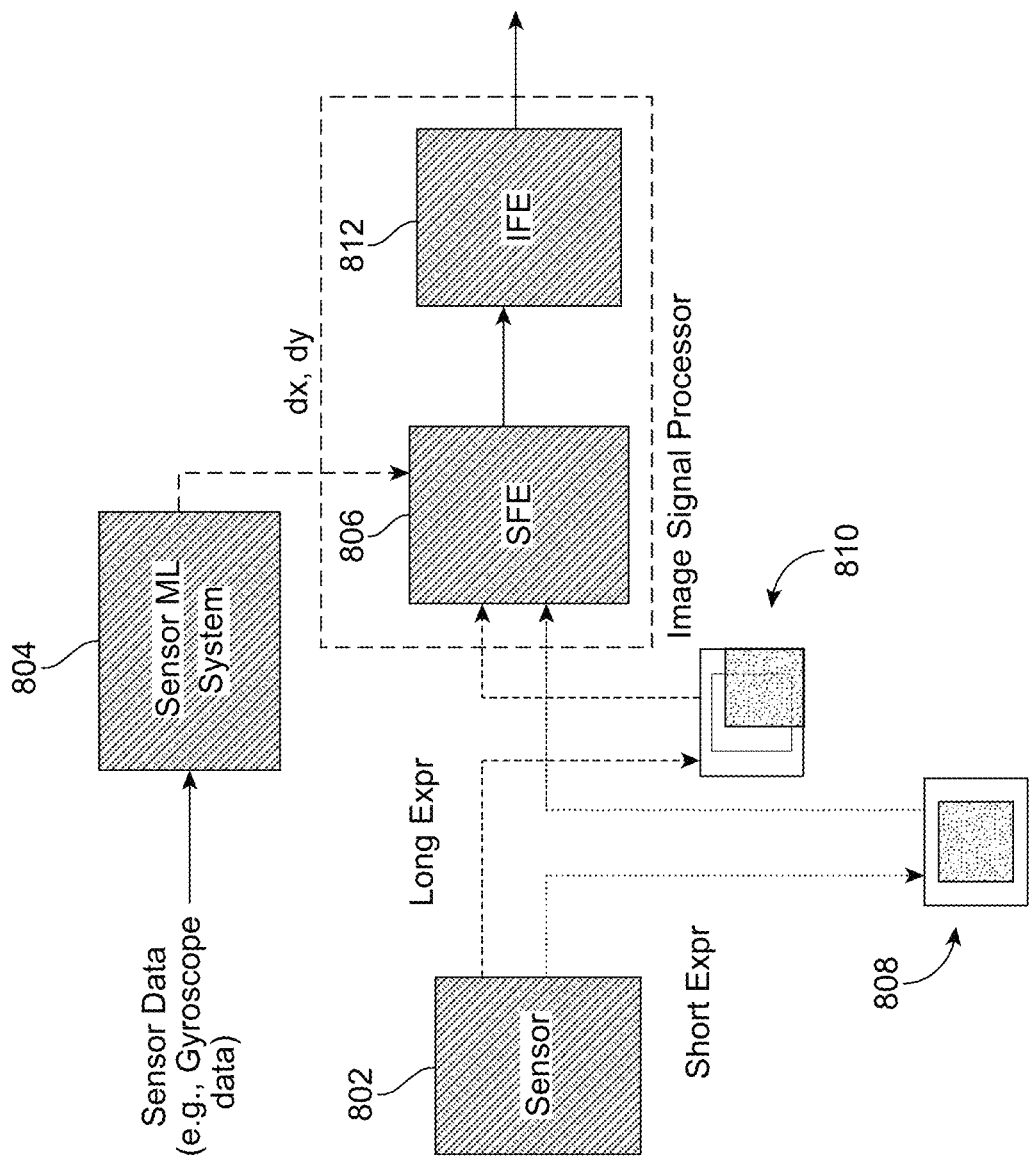
FIG. 8 is a block diagram illustrating example techniques for frame alignment, in accordance with certain aspects of the present disclosure.

FIG. 8 is a block diagram illustrating example techniques for frame alignment, in accordance with certain aspects of the present disclosure. A sensor 802 (e.g., image sensor 230) may generate a long exposure frame 808 and a short exposure frame 810. The short exposure frame 810 may be misaligned from the long exposure frame 808 due to the delay associated with capturing and long and short exposure frames, as described above. The long and short exposure frames 808, 810 are provided to a sensor front end (SFE) 806 for alignment and fusion.

Sensor data (e.g., gyroscope data, accelerometer data, IMU data, any combination thereof, and/or other data) may be provided to a sensor machine learning (ML) system library 804. In one illustrative example, the sensor ML system library 804 may include a recurring neural network (RNN) library 804. Using the sensor ML system library 804 (e.g., the RNN library), predicted alignment parameters (e.g., an average alignment) may be selected corresponding to the delay between the capture of short and long frames (e.g., estimated or average motion delay (D) shown in FIG. 5) and based on the sensor data (e.g., gyroscope data, accelerometer data, IMU data, etc.), as shown. The sensor ML system library 804 (e.g., the RNN library) may include estimated values of alignment offsets as a function of sensor data (e.g., gyroscope data), assuming an average delay between the capture of short and long frame sensor data. Thus, the sensor ML system library 804 (e.g., the RNN library) may be used to estimate the shift in pixels two or three frames in advance, allowing programming of operations for the alignment for future frames. Thus, by the time a frame is captured and received, the associated shift to be applied for the frame has been estimated, allowing the shift to occur for the frame. The sensor ML system library 804 (e.g., the RNN library) uses historical data to predict the frame shift as applicable to future frames (e.g., two or three frames in advance).

The RNN library may output a change in the x dimension (dx) and a change in the y dimension to be applied to the long frame for alignment to the short frame. Pixels of the long frame may be adjusted (e.g., shifted based on dx and dy) accordingly. For example, the SFE 806 may receive the parameters dx and dy and perform an in-line fusion (e.g., a sensor Bayer in-line fusion) of the short and long frames by performing the alignment of the long frame to the short frame using the dx and dy parameters. The image front end (IFE) 812 converts the output from the SFE 806 (e.g., a Bayer format output) to a red-green-blue (RGB) output.

Figure 9:
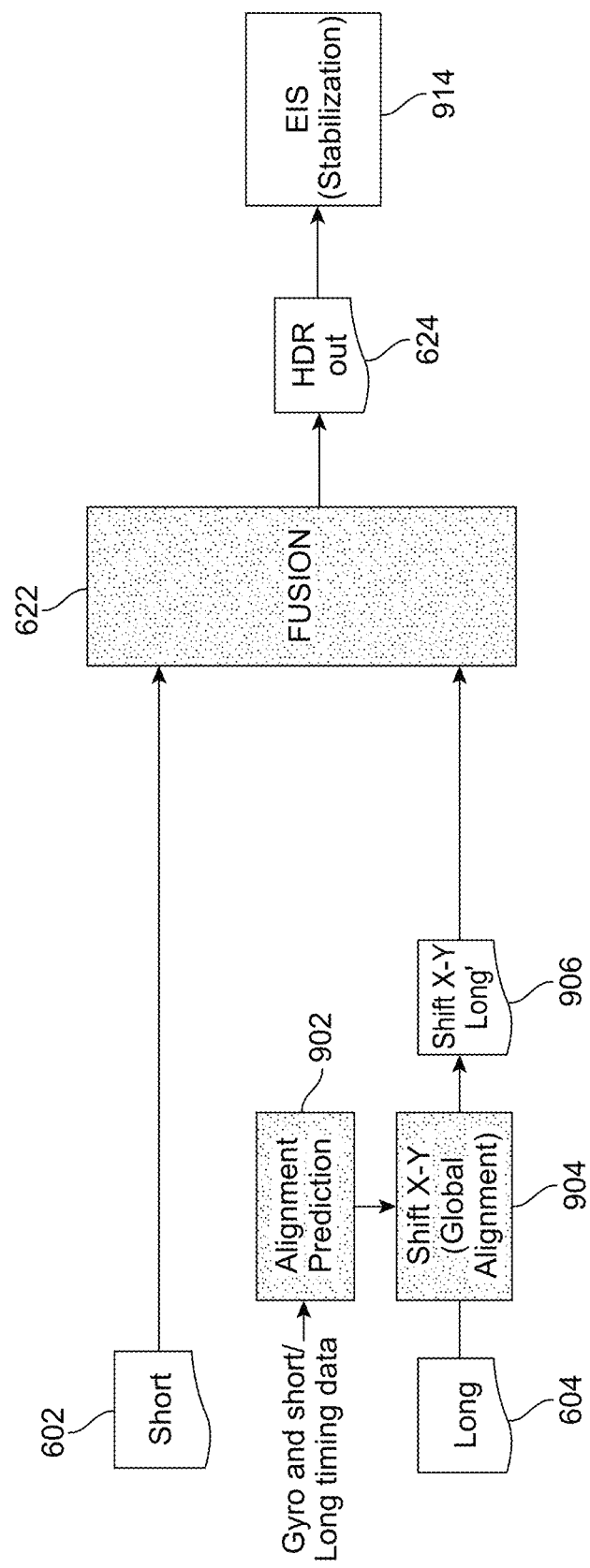
FIG. 9 illustrates an example image processing system using alignment prediction, in accordance with certain aspects of the present disclosure.

FIG. 9 illustrates an example image processing system using alignment prediction, in accordance with certain aspects of the present disclosure. As shown, an alignment prediction library 902 (e.g., including the sensor ML system library 804 described with respect to FIG. 8) may receive sensor input (e.g., gyroscope sensor data, accelerometer data, IMU data, etc.) and a timing input. The timing input can include a delay (D) between long and short frame captures. The alignment prediction library 902 can generate an alignment grid (e.g., a 35×27 grid or grid of another size) that provides mapping of pixels to align a current long frame to a current short frame. Based on the alignment grid, an average shift of pixels in the x dimension and an average shift of pixels in the y dimension may be determined (e.g., by the alignment prediction library 902 or the shift engine 904) for the current frame. The average shift in the x and y dimensions are input to the sensor ML system library 804

(e.g., the RNN library). The sensor ML system library 804 (e.g., the RNN library) may have also received the average shift in the x and y dimensions for one or more previous frames (e.g., frame captured prior to the current frame). Based on the average shift information of the current and previous frames, the sensor ML system library 804 (e.g., the RNN library) predicts a shift for a future frame (e.g., two or three frames in advance). For example, the sensor ML system library 804 (e.g., the RNN library) may provide a predicted shift to be applied three frames in advance. The sensor ML system library 804 (e.g., the RNN library) may be generated using a machine learning model trained using a supervised training technique. For example, frame data may be obtained for training the machine learning model by implementing various camera movements when capturing images or frames for training.

Once the shift has been predicted using the RNN library, a shift engine 904 may shift the long frame 604 using the shift prediction to generate the shifted long frame 906 (labeled shift X-Y long'). The shifted long frame 906 and the short frame 602 may be provided from the shift engine 904 to a fusion engine 622 to generate an HDR output 624. For example, the fusion engine 622 may, for each pixel of the short exposure frame, determine whether a saturation associated with the pixel is less than a lower threshold and if so, use a corresponding pixel of the long exposure frame for the HDR output 624. If the saturation associated with the pixel is greater than an upper threshold, the fusion engine 622 may use the corresponding pixel of the short exposure frame. If the saturation is between the lower and upper thresholds, the corresponding pixels from the short and long exposure frames may be blended to generate the associated pixel for the HDR output. As shown, at block 914, electronic image stabilization (EIS) may be applied for generating a video output (e.g., using current and future frames to stabilize the video).

Figure 10:
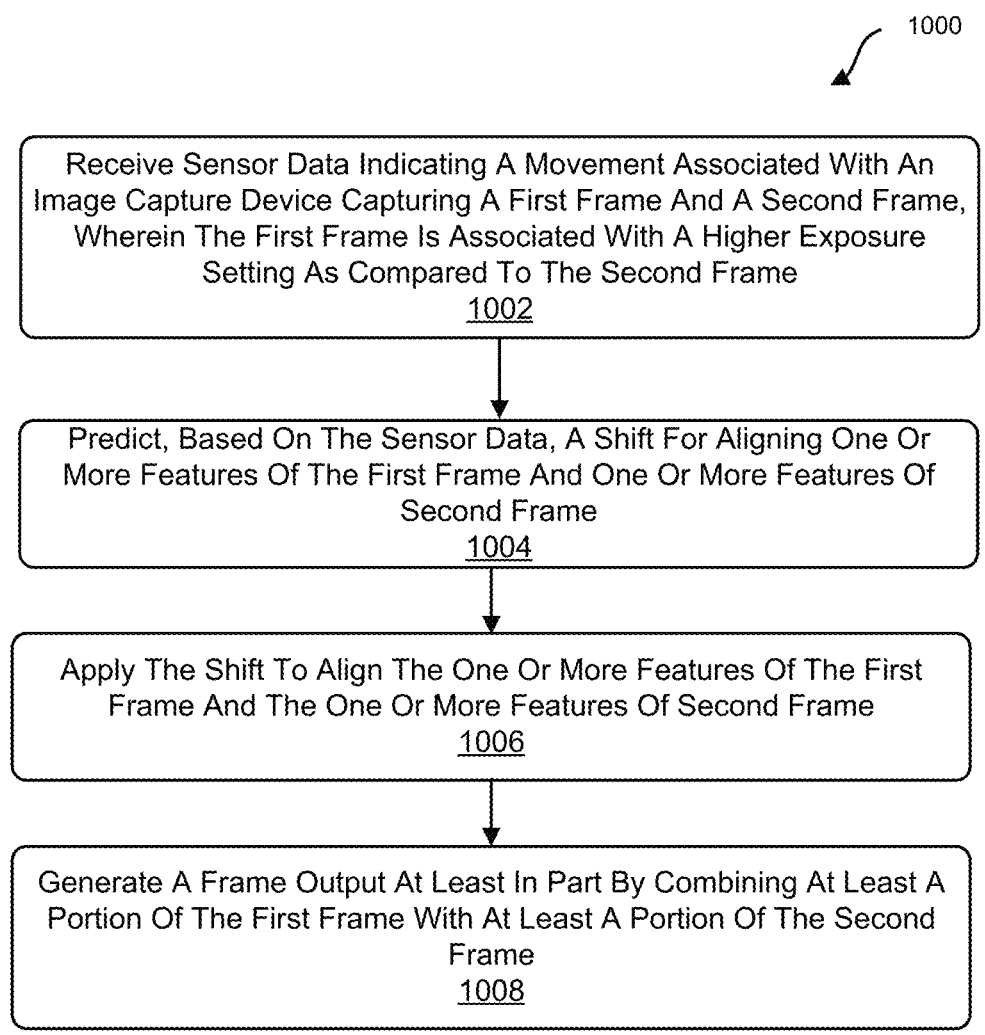
FIG. 10 is a flow diagram illustrating an example of a process of capturing images.

FIG. 10 is a flow diagram illustrating an example of a process 1000 of capturing images. The process 1000 may be performed by a frame alignment system, such as a processor 1310, and in some aspects, a storage device 1330. At block 1002, the process 1000 includes receiving sensor data (e.g., gyroscope data and/or other sensor data) indicating a movement associated with an image capture device (e.g., image capture device 205A) capturing a first frame and a second frame, wherein the first frame is associated with a higher exposure setting (e.g., a longer exposure time) as compared to the second frame.

At block 1004, the frame alignment system predicts a shift for aligning one or more features of the first frame and the one or more features of the second frame based on the sensor data. In some aspects, the shift is predicted prior to the first frame and the second frame being captured.

In some aspects, the frame alignment system may receive an estimate of a delay associated with capturing a high exposure setting frame (e.g., long exposure frame) and a low exposure setting frame (e.g., short exposure frame) to be combined for generating a high dynamic range (HDR) output. The shift may be further predicted based on the estimate of the delay. In some aspects, the estimate of the delay may include an average delay between capturing high exposure setting frames and short exposure setting frames. In some aspects, the shift is predicted based on a sensor-based alignment library (e.g., sensor ML system library 804, which may include an RNN library as noted above) generated using a trained machine learning model. The trained machine learning model may include a recurring neural network.

At block 1006, the frame alignment system applies the shift to align the one or more features of the first frame and one or more features of second frame. The one or more features of the first frame may be the same as the one or more features of the second frame. For example, the shift may be applied to the first frame having the higher exposure setting to align the one or more features of the first frame with one or more features of the second frame.

At block 1008, the frame alignment system generates a frame output (e.g., an HDR frame output) at least in part by combines at least a portion of the first frame with at least a portion of the second frame, as described herein.

In some aspects, the frame alignment system accumulates first image sensor data associated with the first frame in a first buffer (e.g., buffer 703), and accumulates second image sensor data associated with the second frame in a second buffer (e.g., buffer 705). The shift may be applied based on the first image sensor data in the first buffer while the first image sensor data is being accumulated.

In some examples, the processes described herein (e.g., process 1000 and/or other process described herein) may be performed by a computing device or apparatus. In one example, one or more of the processes can be performed by the image capture system 300 of FIG. 3. In another example, one or more of the processes can be performed by the computing system 1300 shown in FIG. 13. For instance, a computing device with the computing system 1300 shown in FIG. 13 can include the components of the image capture system 300 and can implement the operations of the process 1000 of FIG. 10 and/or other process described herein.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the process 1000 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1000, are illustrated as a logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000, and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
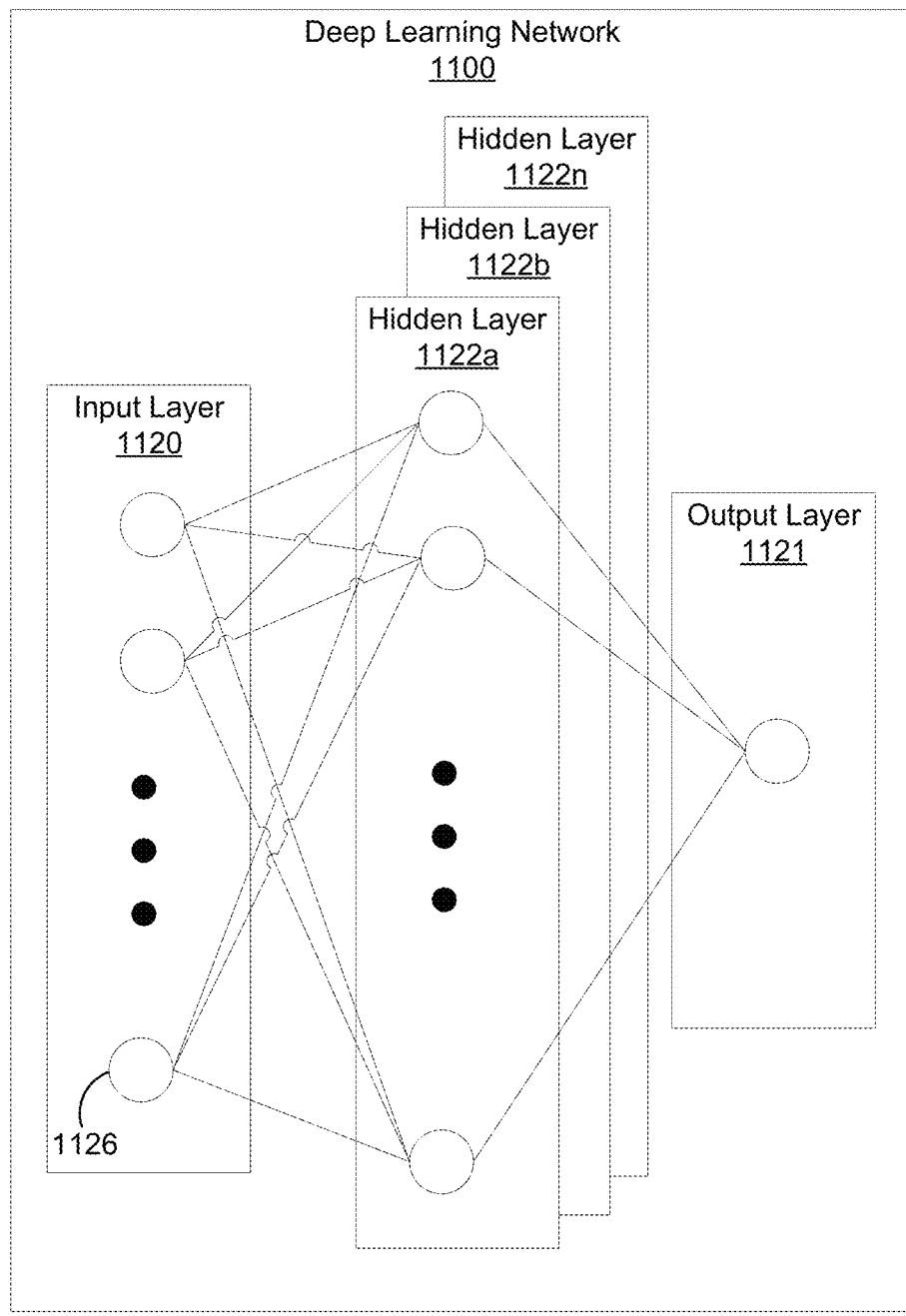
FIG. 11 is an illustrative example of a deep learning neural network that can be used to implement machine learning-based alignment prediction.

As noted above, various aspects of the present disclosure can use machine learning models or systems. FIG. 11 is an illustrative example of a deep learning neural network 1100 that can be used to implement the machine learning based alignment prediction described above. An input layer 1120 includes input data. In one illustrative example, the input layer 1120 can include data representing the pixels of an input video frame. The neural network 1100 includes multiple hidden layers 1122a, 1122b, through 1122n. The hidden layers 1122a, 1122b, through 1122n include "n" number of hidden layers, where "n" is an integer greater than or equal to one. The number of hidden layers can be made to include as many layers as needed for the given application. The neural network 1100 further includes an output layer 1121 that provides an output resulting from the processing performed by the hidden layers 1122a, 1122b, through 1122n. In one illustrative example, the output layer 1121 can provide a classification for an object in an input video frame. The classification can include a class identifying the type of activity (e.g., looking up, looking down, closing eyes, yawning, etc.).

The neural network 1100 is a multi-layer neural network of interconnected nodes. Each node can represent a piece of information. Information associated with the nodes is shared among the different layers and each layer retains information as information is processed. In some cases, the neural network 1100 can include a feed-forward network, in which case there are no feedback connections where outputs of the network are fed back into itself. In some cases, the neural network 1100 can include a recurrent neural network, which can have loops that allow information to be carried across nodes while reading in input.

Information can be exchanged between nodes through node-to-node interconnections between the various layers. Nodes of the input layer 1120 can activate a set of nodes in the first hidden layer 1122a. For example, as shown, each of the input nodes of the input layer 1120 is connected to each of the nodes of the first hidden layer 1122a. The nodes of the first hidden layer 1122a can transform the information of each input node by applying activation functions to the input node information. The information derived from the transformation can then be passed to and can activate the nodes of the next hidden layer 1122b, which can perform their own designated functions. Example functions include convolutional, up-sampling, data transformation, and/or any other suitable functions. The output of the hidden layer 1122b can then activate nodes of the next hidden layer, and so on. The output of the last hidden layer 1122n can activate one or more nodes of the output layer 1121, at which an output is provided. In some cases, while nodes (e.g., node 1126) in the neural network 1100 are shown as having multiple output lines, a node has a single output and all lines shown as being output from a node represent the same output value.

In some cases, each node or interconnection between nodes can have a weight that is a set of parameters derived from the training of the neural network 1100. Once the neural network 1100 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 1100 to be adaptive to inputs and able to learn as more and more data is processed.

The neural network 1100 is pre-trained to process the features from the data in the input layer 1120 using the different hidden layers 1122a, 1122b, through 1122n in order to provide the output through the output layer 1121. In an example in which the neural network 1100 is used to identify features and/or objects in images, the neural network 1100 can be trained using training data that includes both images and labels, as described above. For instance, training images can be input into the network, with each training frame having a label indicating the features in the images (for a feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 1100 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 1100 is trained well enough so that the weights of the layers are accurately tuned.

For the example of identifying features and/or objects in images, the forward pass can include passing a training image through the neural network 1100. The weights are initially randomized before the neural network 1100 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 1100, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1100 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1100 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 1100 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 1100 can include any other deep network other than a CNN, such as an autoencoder, a deep belief nets (DBNs), a Recurrent Neural Networks (RNNs), among others.

Figure 12:
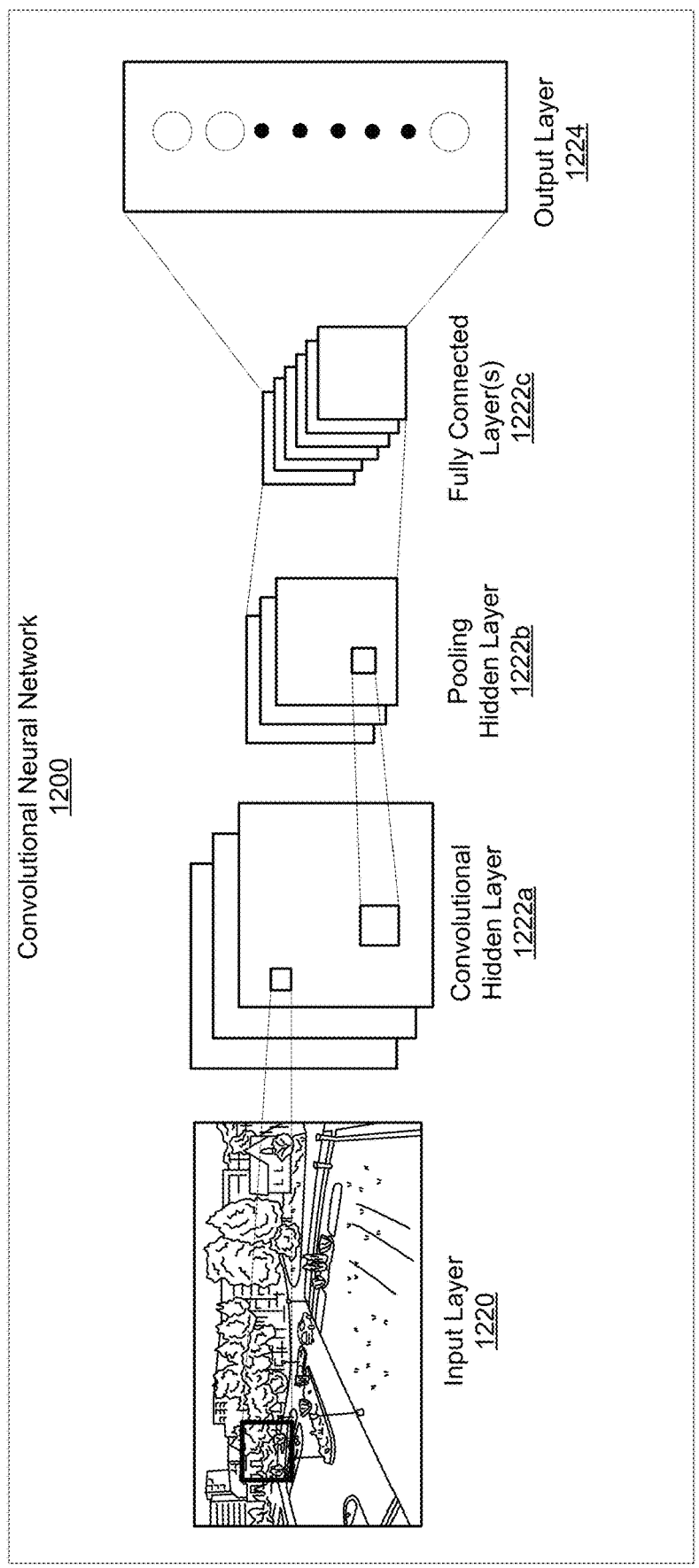
FIG. 12 is an illustrative example of a convolutional neural network (CNN).

FIG. 12 is an illustrative example of a convolutional neural network (CNN) 1200. The input layer 1220 of the CNN 1200 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1222*a*, an optional non-linear activation layer, a pooling hidden layer 1222*b*, and fully connected hidden layers 1222*c* to get an output at the output layer 1224. While only one of each hidden layer is shown in FIG. 12, one of ordinary skill will appreciate that multiple convolutional hidden layers, non-linear layers, pooling hidden layers, and/or fully connected layers can be included in the CNN 1200. As previously described, the output can indicate a single class of an object or can include a probability of classes that best describe the object in the image.

The first layer of the CNN 1200 is the convolutional hidden layer 1222*a*. The convolutional hidden layer 1222*a* analyzes the image data of the input layer 1220. Each node of the convolutional hidden layer 1222*a* is connected to a region of nodes (pixels) of the input image called a receptive field. The convolutional hidden layer 1222*a* can be considered as one or more filters (each filter corresponding to a different activation or feature map), with each convolutional iteration of a filter being a node or neuron of the convolutional hidden layer 1222*a*. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1222*a*. Each connection between a node and a receptive field for that node learns a weight and, in some cases, an overall bias such that each node learns to analyze its particular local receptive field in the input image. Each node of the hidden layer 1222*a* will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1222*a* is due to each node of the convolutional layer being applied to its corresponding receptive field. For example, a filter of the convolutional hidden layer 1222*a* can begin in the top-left corner of the input image array and can convolve around the input image. As noted above, each convolutional iteration of the filter can be considered a node or neuron of the convolutional hidden layer 1222*a*. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1222*a*. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1222*a*.

The mapping from the input layer to the convolutional hidden layer 1222*a* is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1222a can include several activation maps in order to identify multiple features in an image. The example shown in FIG. 12 includes three activation maps. Using three activation maps, the convolutional hidden layer 1222a can detect three different kinds of features, with each feature being detectable across the entire image.

In some examples, a non-linear hidden layer can be applied after the convolutional hidden layer 1222a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1200 without affecting the receptive fields of the convolutional hidden layer 1222a.

The pooling hidden layer 1222b can be applied after the convolutional hidden layer 1222a (and after the non-linear hidden layer when used). The pooling hidden layer 1222b is used to simplify the information in the output from the convolutional hidden layer 1222a. For example, the pooling hidden layer 1222b can take each activation map output from the convolutional hidden layer 1222a and generates a condensed activation map (or feature map) using a pooling function. Max-pooling is one example of a function performed by a pooling hidden layer. Other forms of pooling functions be used by the pooling hidden layer 1222a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1222a. In the example shown in FIG. 12, three pooling filters are used for the three activation maps in the convolutional hidden layer 1222a.

In some examples, max-pooling can be used by applying a max-pooling filter (e.g., having a size of 2×2) with a stride (e.g., equal to a dimension of the filter, such as a stride of 2) to an activation map output from the convolutional hidden layer 1222a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1222a having a dimension of 24×24 nodes, the output from the pooling hidden layer 1222b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1200.

The final layer of connections in the network is a fully-connected layer that connects every node from the pooling hidden layer 1222b to every one of the output nodes in the output layer 1224. Using the example above, the input layer includes 28×28 nodes encoding the pixel intensities of the input image, the convolutional hidden layer 1222a includes 3×24×24 hidden feature nodes based on application of a 5×5 local receptive field (for the filters) to three activation maps, and the pooling hidden layer 1222b includes a layer of 3×12×12 hidden feature nodes based on application of max-pooling filter to 2×2 regions across each of the three feature maps. Extending this example, the output layer 1224 can include ten output nodes. In such an example, every node of the 3×12×12 pooling hidden layer 1222b is connected to every node of the output layer 1224.

The fully connected layer 1222c can obtain the output of the previous pooling hidden layer 1222b (which should represent the activation maps of high-level features) and determines the features that most correlate to a particular class. For example, the fully connected layer 1222c layer can determine the high-level features that most strongly correlate to a particular class, and can include weights (nodes) for the high-level features. A product can be computed between the weights of the fully connected layer 1222c and the pooling hidden layer 1222b to obtain probabilities for the different classes. For example, if the CNN 1200 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1224 can include an M-dimensional vector (in the prior example, M=10). M indicates the number of classes that the CNN 1200 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

FIG. 13 is a diagram illustrating an example of a system for implementing certain aspects of the present technology. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300. Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for frame alignment, comprising: a memory; and at least one processor coupled to the memory and configured to: receive sensor data indicating a movement associated with an image capture device capturing a first frame and a second frame, wherein the first frame is associated with a higher exposure setting as compared to the second frame; predict, based on the sensor data, a shift for aligning one or more features of the first frame and one or more features of the second frame; apply the shift to align the one or more features of the first frame and the one or more features of second frame; and generate a frame output at least in part by combining at least a portion of the first frame with at least a portion of the second frame.

Aspect 2. The apparatus of aspect 1, wherein the shift is predicted prior to the first frame and the second frame being captured.

Aspect 3. The apparatus of any one of aspects 1-2, wherein the at least one processor is configured to: receive an estimate of a delay associated with capturing a high exposure setting frame and a low exposure setting frame to be combined for generating a high dynamic range (HDR) output; and predict the shift based on the estimate of the delay.

Aspect 4. The apparatus of any one of aspects 1-3, wherein the first frame being associated with a higher exposure setting as compared to the second frame comprises the first frame being associated with a longer exposure time as compared to the second frame.

Aspect 5. The apparatus of any one of aspects 1-4, wherein the at least one processor is configured to predict the shift based on a sensor-based alignment library generated using a trained machine learning model.

Aspect 6. The apparatus of aspect 5, wherein the trained machine learning model comprises a recurring neural network.

Aspect 7. The apparatus of any one of aspects 1-6, wherein, to apply the shift, the at least one processor is configured to apply the shift to the first frame having the higher exposure setting to align the one or more features of the first frame with the one or more features of the second frame.

Aspect 8. The apparatus of any one of aspects 1-7, wherein the frame output comprises a high dynamic range (HDR) frame output.

Aspect 9. The apparatus of any one of aspects 1-8, wherein the at least one processor is configured to: accumulate first image sensor data associated with the first frame in a first buffer; accumulate second image sensor data associated with the second frame in a second buffer; and apply the shift based on the first image sensor data in the first buffer while the first image sensor data is being accumulated.

Aspect 10. The apparatus of aspect 9, wherein at least one of the first image sensor data or the second image sensor data is accumulated from a center position of the first buffer or the second buffer, respectively.

Aspect 11. The apparatus of any one of aspects 1-10, wherein the sensor data comprises gyroscope data.

Aspect 12. A method for frame alignment, comprising: receiving sensor data indicating a movement associated with an image capture device capturing a first frame and a second frame, wherein the first frame is associated with a higher exposure setting as compared to the second frame; predicting, based on the sensor data, a shift for aligning one or more features of the first frame and one or more features of the second frame; applying the shift to align the one or more features of the first frame and the one or more features of second frame; and generating a frame output at least in part by combining at least a portion of the first frame with at least a portion of the second frame.

Aspect 13. The method of aspect 12, wherein the shift is predicted prior to the first frame and the second frame being captured.

Aspect 14. The method of any one of aspects 12-13, further comprising: receiving an estimate of a delay associated with capturing a high exposure setting frame and a low exposure setting frame to be combined for generating a high dynamic range (HDR) output; and predicting the shift based on the estimate of the delay.

Aspect 15. The method of any one of aspects 12-14, wherein the first frame being associated with a higher exposure setting as compared to the second frame comprises the first frame being associated with a longer exposure time as compared to the second frame.

Aspect 16. The method of any one of aspects 12-15, further comprising predicting the shift based on a sensor-based alignment library generated using a trained machine learning model.

Aspect 17. The method of aspect 16, wherein the trained machine learning model comprises a recurring neural network.

Aspect 18. The method of any one of aspects 12-17, wherein applying the shift comprises applying the shift to the first frame having the higher exposure setting to align the one or more features of the first frame with the one or more features of the second frame.

Aspect 19. The method of any one of aspects 12-18, wherein the frame output comprises a high dynamic range (HDR) frame output.

Aspect 20. The method of any one of aspects 12-19, further comprising: accumulating first image sensor data associated with the first frame in a first buffer; accumulating second image sensor data associated with the second frame in a second buffer; and applying the shift based on the first image sensor data in the first buffer while the first image sensor data is being accumulated.

Aspect 21. The method of aspect 20, wherein at least one of the first image sensor data or the second image sensor data is accumulated from a center position of the first buffer or the second buffer, respectively.

Aspect 22. The method of any one of aspects 12-21, wherein the sensor data comprises gyroscope data.

Aspect 23. A computer-readable medium comprising at least one instruction for causing a computer or processor to perform operations according to any of aspects 1 to 22.

Aspect 24. An apparatus for model generation, the apparatus including means for performing operations according to any of aspects 1 to 22.

Aspect 25. An apparatus for model generation. The apparatus includes at least one memory and at least one processor coupled to the at least one memory. The at least one processor is configured to perform operations according to any of aspects 1 to 22.

What is claimed is:

1. An apparatus for frame alignment, comprising:
at least one memory; and
at least one processor coupled to the at least one memory and configured to:
receive sensor data indicating a movement associated with an image capture device capturing a first frame and a second frame, wherein the first frame is associated with a higher exposure setting as compared to the second frame;
predict, based on the sensor data and an estimate of a delay associated with capturing at least one high exposure setting frame and at least one low exposure setting frame to be combined for generating at least one high dynamic range (HDR) output, a shift for aligning one or more features of the first frame and one or more features of the second frame;
apply the shift to align the one or more features of the first frame and the one or more features of second frame; and
generate a frame output at least in part by combining at least a portion of the first frame with at least a portion of the second frame.

2. The apparatus of claim 1, wherein at least one processor is configured to predict the shift prior to the first frame and the second frame being captured.

3. The apparatus of claim 1, wherein the at least one processor is configured to:
receive the estimate of the delay.

4. The apparatus of claim 1, wherein the first frame being associated with a higher exposure setting as compared to the second frame comprises the first frame being associated with a longer exposure time as compared to the second frame.

5. The apparatus of claim 1, wherein the at least one processor is configured to predict the shift based on a sensor-based alignment library generated using a trained machine learning model.

6. The apparatus of claim 5, wherein the trained machine learning model comprises a recurring neural network.

7. The apparatus of claim 1, wherein, to apply the shift, the at least one processor is configured to apply the shift to the first frame having the higher exposure setting to align the one or more features of the first frame with the one or more features of the second frame.

8. The apparatus of claim 1, wherein the frame output comprises an HDR frame output.

9. The apparatus of claim 1, wherein the at least one processor is configured to:
accumulate first image sensor data associated with the first frame in a first buffer;
accumulate second image sensor data associated with the second frame in a second buffer; and
apply the shift based on the first image sensor data in the first buffer while the first image sensor data is being accumulated.

10. The apparatus of claim 9, wherein the at least one processor is configured to accumulate at least one of the first image sensor data or the second image sensor data from a center position of the first buffer or the second buffer, respectively.

11. The apparatus of claim 1, wherein the sensor data comprises gyroscope data.

12. A method for frame alignment, comprising:
receiving sensor data indicating a movement associated with an image capture device capturing a first frame and a second frame, wherein the first frame is associated with a higher exposure setting as compared to the second frame;
predicting, based on the sensor data and an estimate of a delay associated with capturing at least one high exposure setting frame and at least one low exposure setting frame to be combined for generating at least one high dynamic range (HDR) output, a shift for aligning one or more features of the first frame and one or more features of the second frame;

applying the shift to align the one or more features of the first frame and the one or more features of second frame; and generating a frame output at least in part by combining at least a portion of the first frame with at least a portion of the second frame.

13. The method of claim 12, wherein the shift is predicted prior to the first frame and the second frame being captured.

14. The method of claim 12, further comprising:
receiving the estimate of the delay.

15. The method of claim 12, wherein the first frame being associated with a higher exposure setting as compared to the second frame comprises the first frame being associated with a longer exposure time as compared to the second frame.

16. The method of claim 12, further comprising predicting the shift based on a sensor-based alignment library generated using a trained machine learning model.

17. The method of claim 16, wherein the trained machine learning model comprises a recurring neural network.

18. The method of claim 12, wherein applying the shift comprises applying the shift to the first frame having the higher exposure setting to align the one or more features of the first frame with the one or more features of the second frame.

19. The method of claim 12, wherein the frame output comprises an HDR frame output.

20. The method of claim 12, further comprising:
accumulating first image sensor data associated with the first frame in a first buffer;
accumulating second image sensor data associated with the second frame in a second buffer; and
applying the shift based on the first image sensor data in the first buffer while the first image sensor data is being accumulated.

21. The method of claim 20, wherein at least one of the first image sensor data or the second image sensor data is accumulated from a center position of the first buffer or the second buffer, respectively.

22. The method of claim 12, wherein the sensor data comprises gyroscope data.

23. A non-transitory computer-readable medium having instructions, which when executed by one or more processors, cause the one or more processors to:

receive sensor data indicating a movement associated with an image capture device capturing a first frame and a second frame, wherein the first frame is associated with a higher exposure setting as compared to the second frame;

predict, based on the sensor data and an estimate of a delay associated with capturing at least one high exposure setting frame and at least one low exposure setting frame to be combined for generating at least one high dynamic range (HDR) output, a shift for aligning one or more features of the first frame and one or more features of the second frame;

apply the shift to align the one or more features of the first frame and the one or more features of second frame; and generate a frame output at least in part by combining at least a portion of the first frame with at least a portion of the second frame.

* * * * *